(12) United States Patent
Naganuma et al.

(10) Patent No.: US 7,446,443 B2
(45) Date of Patent: Nov. 4, 2008

(54) ELECTROMAGNETIC-DRIVING DEVICE AND LIGHT QUANTITY-CONTROL DEVICE INCORPORATING THE SAME

(75) Inventors: Hiroaki Naganuma, Kofu (JP); Yosuke Sajiki, Kofu (JP)

(73) Assignee: Nisca Corporation, Minamikoma-Gun, Yamanashi (JP)

( * ) Notice: Subject to any disclaimer, the term of this patent is extended or adjusted under 35 U.S.C. 154(b) by 333 days.

(21) Appl. No.: 11/410,250

(22) Filed: Apr. 25, 2006

(65) Prior Publication Data

US 2006/0267420 A1 Nov. 30, 2006

(30) Foreign Application Priority Data

May 25, 2005 (JP) ............... 2005-152420

(51) Int. Cl.
G04C 13/11 (2006.01)
H02K 37/12 (2006.01)
H02K 37/14 (2006.01)

(52) U.S. Cl. .................................. 310/49 R

(58) Field of Classification Search ............. 310/49 R, 310/36, 164, 257; 396/463; 335/272, 234; 359/823

See application file for complete search history.

(56) References Cited

U.S. PATENT DOCUMENTS

2007/0159030 A1* 7/2007 Naganuma et al. ........ 310/49 R

FOREIGN PATENT DOCUMENTS

JP 2001-298936 10/2001
JP 2002-049076 2/2002

* cited by examiner

Primary Examiner—Javaid Nasri
(74) Attorney, Agent, or Firm—Manabu Kanesaka (57) ABSTRACT

An electromagnetically-driving device has a rotor with a hollow, cylindrical permanent magnet; an inside yoke on an internal circumference side of the rotor; an outside yoke on an external circumference side of the rotor; and a coil for magnetically exciting the yokes. The outside yoke has a trough shape, and two opposed magnetic pole-guide pieces, between which magnetic poles of the permanent magnet are sandwiched. The rotor has a bearing portion in the internal circumference wall of the body, and the bearing portion engages a shaft portion of the inside yoke. When a magnetic field is generated by the coil, a rotation force is applied to the rotor, resulting in a structurally-simple magnetic circuit.

9 Claims, 9 Drawing Sheets

ELECTROMAGNETIC-DRIVING DEVICE AND LIGHT QUANTITY-CONTROL DEVICE INCORPORATING THE SAME

BACKGROUND OF THE INVENTION AND RELATED ART STATEMENT

The present invention is directed to a light quantity-control device such as a shutter or a beam limiting device used in an image pickup device of a video camera, a still camera or the like, or a projector, and other various optical apparatuses. Also, it relates to a shutter device which blocks a photographed light quantity or projected light quantity with, e.g., a blade member assembled in a barrel of an optical lens, or a light quantity-control device which makes larger or smaller a photographed light quantity or projected light quantity thereby to control it, and an electromagnetically-driving device which opens or closes the blade member.

In general, light quantity-control devices contained in these optical apparatuses, such as a shutter device and a beam limiting device, have been widely known as a shutter device or beam limiting device having a lens barrel, a base (bottom board) assembled in the lens barrel, and a thin plate-type blade member openably attached to the base, in which a light quantity is blocked or controlled by opening or closing the blade member.

Such a blade member is composed of one or more parts, pivotably or slidably supported about an optical-axis aperture of the base by a pivot such as a pin, and further arranged so that it can be driven by an electromagnetically-driving device to be opened or closed. The electromagnetically-driving device includes a rotor with a permanent magnet, and an excitation coil for providing a rotation force to the rotor. Recently, as for particularly these light quantity-control devices, ones which are compact, lightweight, and small in power consumption have been required as downsizing and weight reduction of optical apparatuses have occurred.

According to a conventional structure widely adopted for a driving device like this, a rotor is configured by rotatably supporting a cylindrical permanent magnet inside a coil frame with an external circumference to be wound with a coil, the coil is wound around the external circumference of the coil frame, and the external circumference of the coil is magnetically shielded by a yoke. A device having a configuration like this has a problem of upsizing, and particularly has a problem such that the outer diameter of a core part becomes larger, which has an external circumference with a coil wound around it, a magnet rotor placed therein, and a rotating shaft of the rotor placed inside the rotor.

Hence, e.g., JP-A-2001-298936 and JP-A-2002-049076 have proposed a method including the steps of: arranging a magnet rotor formed in a hollow, cylindrical shape and an excitation coil annularly wound along a direction of the axis above and below; leading a magnetic field of the excitation coil to the circumference of the magnet rotor using the yoke made a soft magnetic material thereby to form magnetic poles. In the devices proposed in the patent documents, a magnet rotor is formed in a hollow, cylindrical shape, an inside yoke and an outside yoke are disposed in a central aperture portion of the rotor and an external circumference portion of the rotor so as to surround the magnet of the rotor, respectively. The inside and outside yokes lead a magnetic force from a coil disposed in a different location from the magnet rotor to the circumference of the magnet rotor, whereby a rotation force is generated.

An electromagnetically-driving device like this can be made more compact by reduction in its outer diameter because of having a structure such that a hollow magnet rotor is disposed inside an outside yoke in a thin-plate cylinder shape, and an inside yoke in a rod shape is provided inside the magnet rotor. In addition, the magnet rotor obtains a rotation torque in an external circumference portion close to the permissible device outer diameter and as such, a larger rotation force can be generated even when the device is compact. Further, a magnetic circuit constituted by the outside yoke, magnet rotor and inside yoke in order has the following features: the permeance of the whole magnetic circuit is high; and electric power consumption can be reduced. This is because the gap between the outside yoke and magnet rotor and the gap between the magnet rotor and inside yoke can be reduced in size to the minimum as long as rotation of the rotor is permissible.

For an electromagnetically-driving device having such structure, the following structure is adopted in order to rotatably support the magnet rotor. In the device described in JP-A-2001-298936, the inside yoke to be disposed in a center portion of the hollow, cylindrical permanent magnet is formed in a hollow shape, the rotating shaft of the magnet rotor is put into the center hole of the inside yoke, and both the ends of the rotating shaft are borne by the board and the outside yoke.

In the device described in JP-A-2002-049076, a columnar inside yoke is disposed in a center hole of the hollow, cylindrical permanent magnet, and a concave groove for use of bearing is formed in an end face located in a leading end of the inside yoke. The two opposite ends of the rotating shaft provided in a center portion of the magnet rotor are borne by the concave groove formed in the end face of the inside yoke and a bearing hole formed in the base.

According to the bearing structure disclosed in JP-A-2001-298936, the inside yoke is provided inside the magnet rotor, and the rotating shaft of the rotor is provided further inside the inside yoke. Therefore, the device has raised problems concerning downsizing of the device as follows. The first is that the device has a relatively larger diameter and is of large size. The second is that it is difficult to align the annularly formed inside yoke with the rotating shaft formed in the center of the rotor. The third is that the magnetic gap between the magnet and the inside yoke is changed by rotation of the rotor.

According to the bearing structure proposed in JP-A-2002-049076, the concave groove for use of bearing is formed in the shaft end face of the columnar inside yoke. Thus, a wedge-shaped notch is formed in the end face of leading end of the inside yoke, whereby a magnetic force line formed in a loop between the inside yoke and outside yoke is attenuated. In other words, the bearing structure has the following disadvantage: the concave groove remarkably lowers the permeance of the magnetic circuit, which causes a problem on the magnetic circuit formed between the outside yoke and inside yoke. Even with any of the bearing structures proposed in JP-A-2001-298936 and JP-A-2002-049076, reduction in shaft diameter of the rotor makes the processing of the bearing portion more difficult and causes a problem in durability against friction.

Therefore, it is an object of the invention to provide an electromagnetically-driving device, by which, in supporting a cylindrical hollow magnet rotor by an inside yoke, magnetic gaps formed between the magnet rotor and inside and outside yokes respectively can be maintained precisely and with stability, and a large output can be obtained without reduction in permeance of the magnetic circuit even when the device is small. The invention seeks to accomplish downsizing of electromagnetically-driving devices. Therefore, it is another object of the invention to provide a light quantity-control device which is small and compact, and particularly small in device outer diameter.

Further objects and advantages of the invention will be apparent from the following description of the invention.

SUMMARY OF THE INVENTION

To attain the above-described objects, the following configuration is adopted in the invention. An electromagnetically-driving device in association with the invention includes: a rotor including a hollow, cylindrical permanent magnet having a rotation center in its center; an inside yoke disposed on an internal circumference side of the rotor; an outside yoke disposed on an external circumference side of the rotor; and a coil for magnetically exciting the inside and outside yokes.

The outside yoke is composed of a soft magnetic member having a pair of magnetic pole-guide pieces opposed to each other in locations, between which magnetic poles of the permanent magnet are sandwiched. The inside yoke has a shaft portion shaped into a round form in section provided in at least a portion thereof and is secured and disposed in a central portion between the magnetic pole-guide pieces. The rotor is integrally provided with a transmission member for transmitting rotation outside, and includes a bearing portion in its internal circumference face, the bearing portion fitted to the shaft portion of the inside yoke. The bearing portion of the rotor is rotatably fitted and supported to the shaft portion of the inside yoke. The above objects can be attained by such an arrangement.

The outside yoke is composed of a cylindrical member shaped into a trough form in section and having the magnetic pole-guide pieces. The inside yoke is composed of a shaft-like member, and has one end secured to and supported by a bottom portion of the outside yoke. The other end of the inside yoke and an end portion (open end having a trough form in section) of the outside yoke are fixed to and supported by the frame member. The rotor is supported by fitting the bearing portion to the shaft portion formed in the inside yoke. When the driving device is unitized in this way, the rotor is fitted to and supported by the inside yoke with a relatively large diameter. Incidentally, the frame member herein may be an appropriate member. For example, it may be a chassis member of an apparatus to which the device is fixed, or a cap member when it is unitized into a driving device.

Further, the coil is wound around a coil frame fitted to the inside yoke. The rotor is provided with engaging faces abutting against the frame member and the coil frame respectively. Movement in a thrust direction is restricted by the engaging faces. In this case, when a protrusion such as a rib is formed on the engaging face, smooth motion with a small amount of friction can be obtained.

Also, in the above-described arrangement, the outside yoke is fixed and secured to a frame member made of a nonmagnetic substance, and the coil is wound around the coil frame fitted to the inside yoke. Moreover, the rotor is disposed between the frame member and coil frame, and includes abutting faces slidably abutting against the frame member and coil frame respectively, whereby the movement in the thrust direction can be restricted.

Now, it is natural that at least one of the fitting faces of the shaft portion of the inside yoke and the bearing portion of the rotor is composed of a nonmagnetic material. The rotor includes: the hollow, cylindrical permanent magnet; and a holder member composed of a nonmagnetic material for holding the permanent magnet. In this case, the bearing portion is formed in the holder member. Also, the rotor is integrally formed with the permanent magnet and bearing portion by molding of a magnet resin material using a mold die, and a bearing-sliding face of the inside yoke to be fitted to the bearing portion is formed from a nonmagnetic material, which facilitates the manufacture thereof.

Next, the configuration of a light quantity-control device in association with the invention is as follows. The light quantity-control device includes: a base having an optical-axis aperture; a blade member for restricting the optical-axis aperture, the blade member attached to the base; and an electromagnetically-driving device for driving the blade member. For the electromagnetically-driving device, the above-described arrangement is adopted. Further, leading end portions of the two magnetic pole-guide pieces of the outside yoke are secured to the frame member made of a nonmagnetic substance, respectively. The coil is wound around the coil frame fitted to the inside yoke. The rotor is disposed between the frame member and coil frame.

DETAILED DESCRIPTION OF THE PREFERRED EMBODIMENTS

Figure 1:
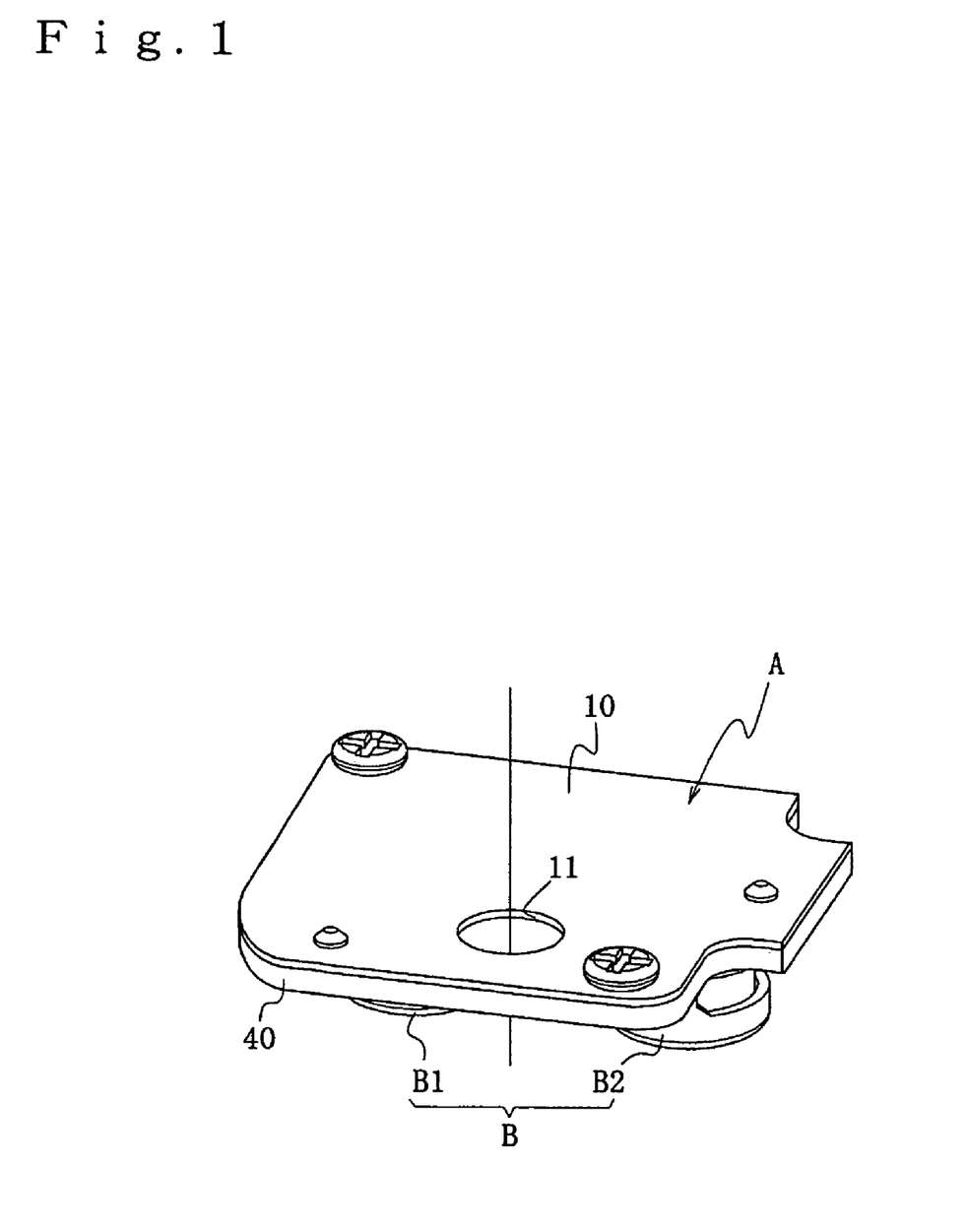
FIG. 1 is a perspective view of a whole light quantity-control device according to the invention, when viewed from a front side thereof.
Figure 2:
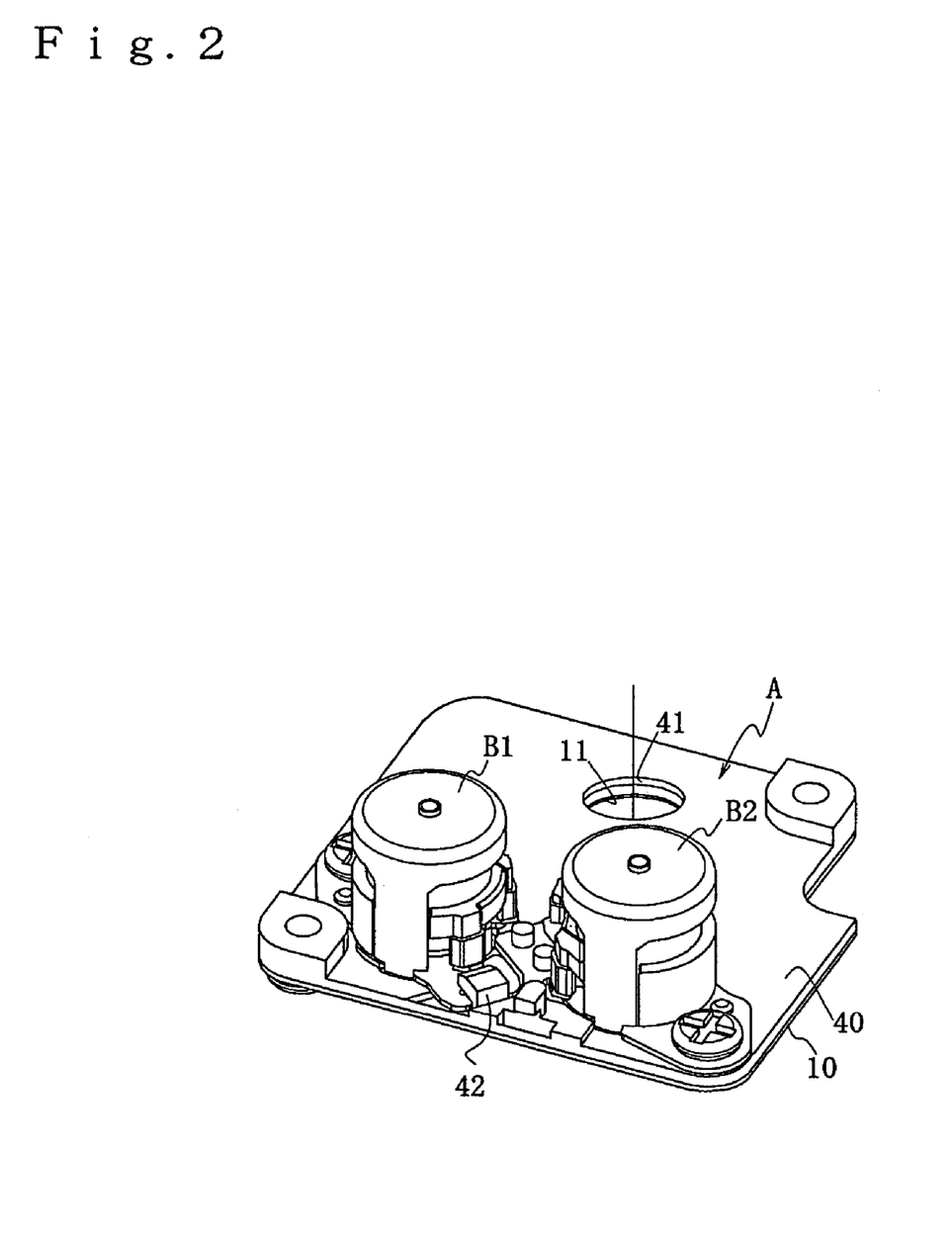
FIG. 2 is a perspective view of the whole light quantity-control device according to the invention, when viewed from a backside thereof.
Figure 3:
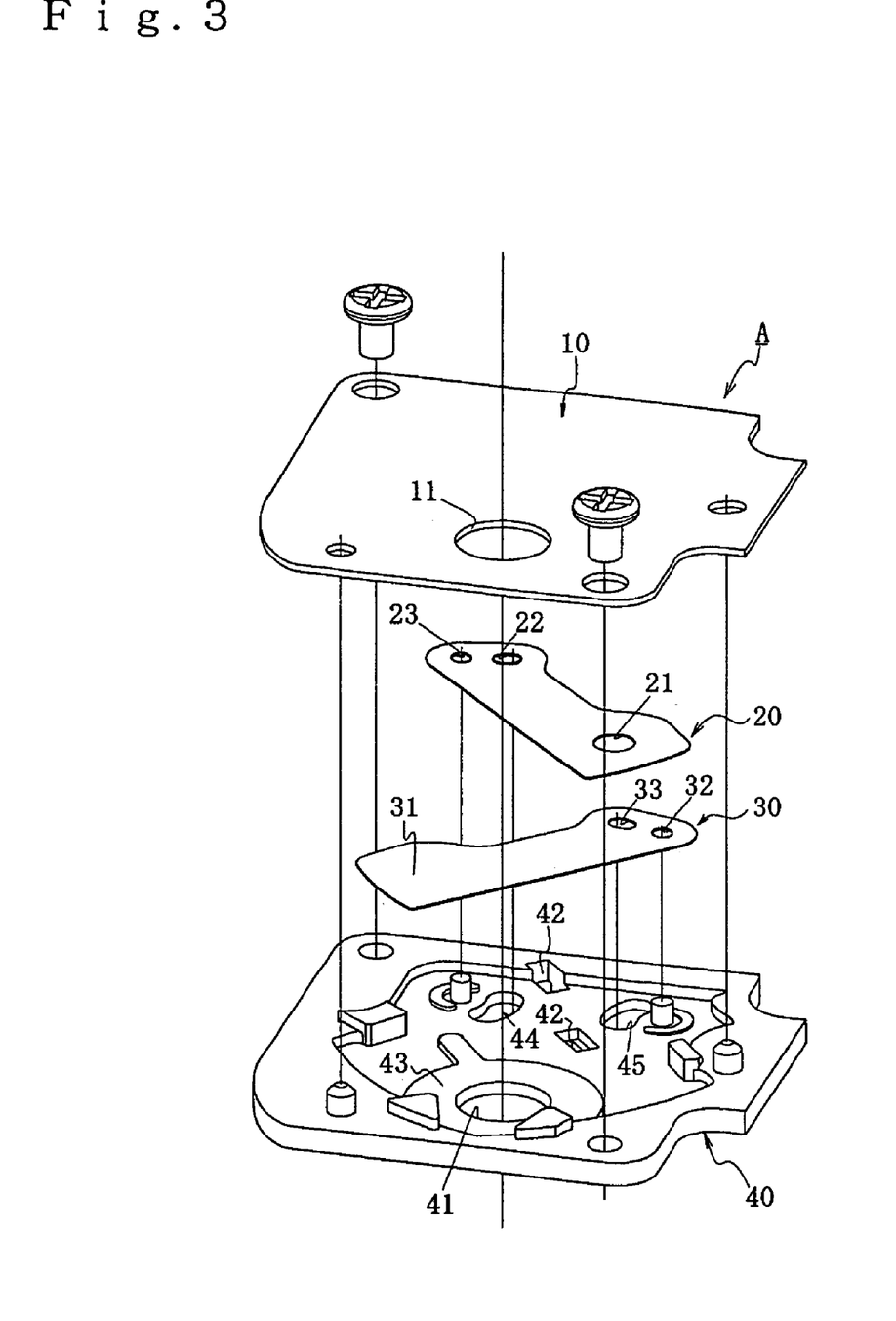
FIG. 3 is an exploded perspective view of the device shown in FIG. 1.
Figure 4:
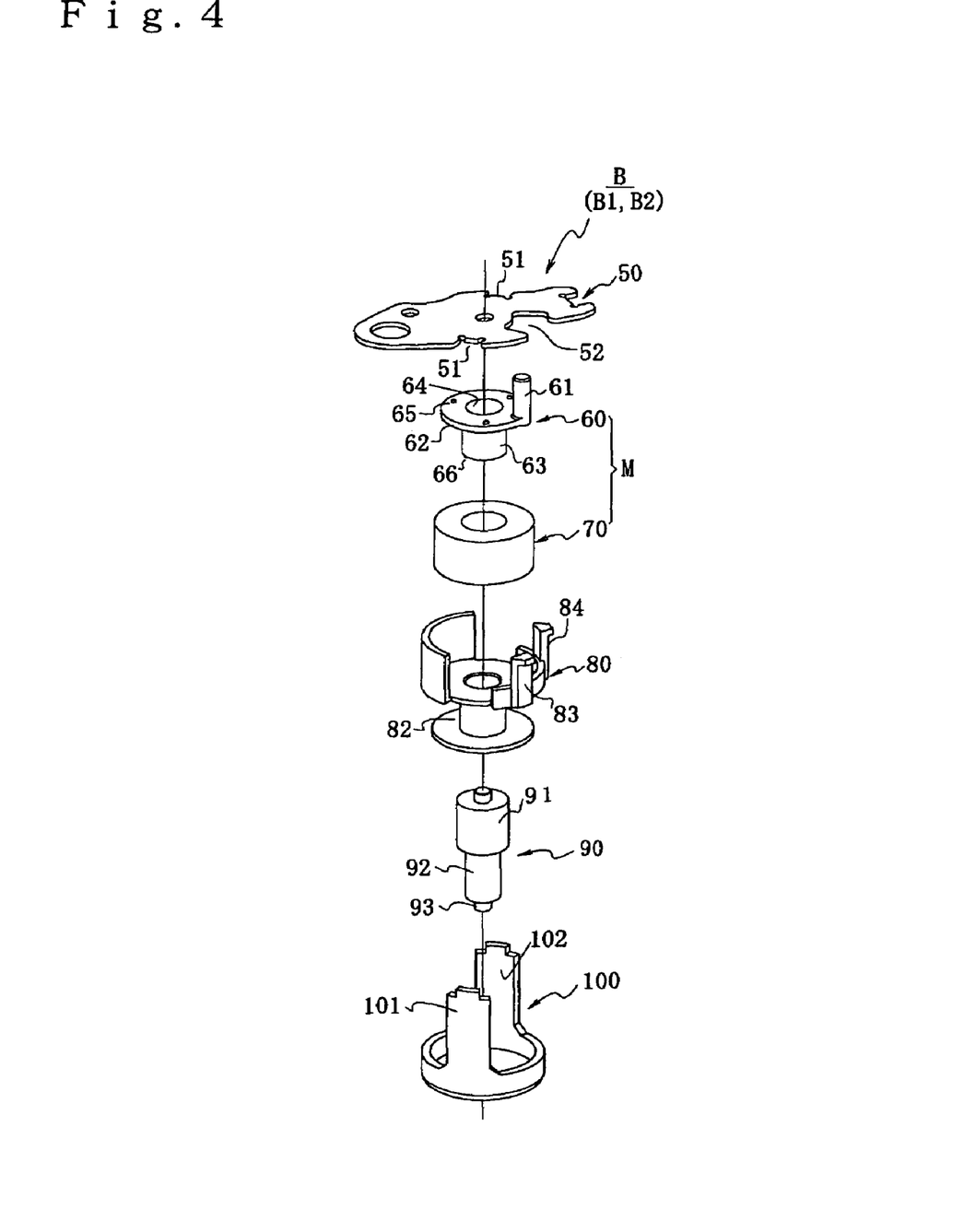
FIG. 4 is an exploded perspective view of an electromagnetically-driving device.
Figure 5:
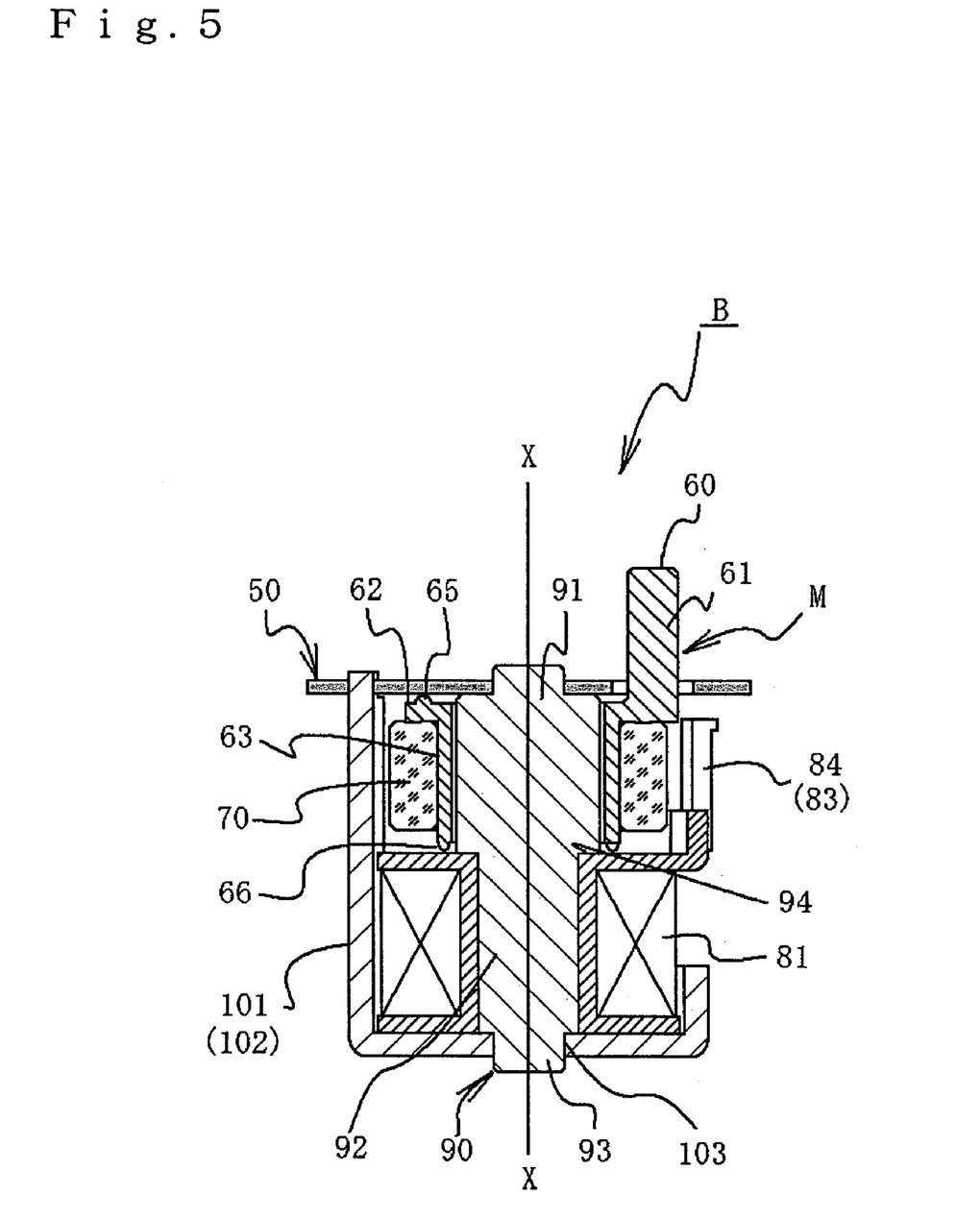
FIG. 5 is a center longitudinal sectional view of a driving part (driving device) in the device shown in FIG. 4.

The details of the invention will be described below based on a preferred embodiment shown in the drawings. FIG. 1 is a perspective view of a whole light quantity-control device according to the invention when viewed from a side of a light-quantity control part of the light quantity-control device. FIG. 2 is a perspective view of the whole light quantity-control device according to the invention shown in FIG. 1 when viewed from a backside of the electromagnetically-driving device. FIG. 3 is an exploded perspective view of the light-quantity control part shown in FIG. 1. FIG. 4 is an exploded perspective view of the electromagnetically-driving device shown in FIG. 2. FIG. 5 is a center longitudinal sectional view of the electromagnetically-driving device shown in FIG. 4, showing, in plan, a section of the driving device obtained when the driving device is cut along a first radial line extending from the center of the device through the center of the supporting member and a second radial line 45° away from the first radial line toward the near side in the drawing.

The light quantity-control device shown in the drawings includes: a light-quantity control part A to be assembled in an image-pickup barrel of various camera devices; and an electromagnetically-driving device B for driving a blade member (including a light-limiting blade 20, and a shutter blade 30) of the light-quantity control part A to open or close the blade member (electromagnetically-driving device B1 for driving the light-limiting blade, and electromagnetically-driving device B2 for driving the shutter blade). As shown in FIG. 3, the light-quantity control part A includes: a base 40 assembled in a barrel of a camera device; a light-limiting blade 20 and a shutter blade 30, which are assembled in the base 40; and a retaining plate 10 for holding the light-limiting blade 20 and shutter blade 30 in the base 40.

The base 40 is molded out of a resin or formed from a metal plate made of a nonmagnetic material such as aluminum in an appropriate shape, and has an optical-axis aperture 41 which coincides with an image-pickup optical axis Y-Y in its center. The base 40 is assembled in the lens barrel of the camera device so that it is orthogonal to the shooting optical axis Y-Y. The center of the optical-axis aperture 41 is coincident with the shooting optical axis Y-Y. Further, the base 40 is integrally formed with a fixing part 42 (FIG. 2), to which the later-described electromagnetically-driving device B is to be fixed, and a guide rib 43 for guiding the light-limiting blade 20 and shutter blade 30. Therefore, the light-limiting blade 20 and shutter blade 30 are attached on the surface side of the base 40, and the electromagnetically-driving device B is fixed on the rear surface side thereof.

The retaining plate 10 serves to hold the light-limiting blade 20 and shutter blade 30 so that they are rotatable to the base 40 as described above, and has an optical aperture 11 formed therein. The optical aperture 11 is for deciding an open diameter of the optical system, which is similar in shape to, but slightly smaller than the optical-axis aperture 41 of the base 40 with its center coincident with the image-pickup optical axis.

In addition, the light-limiting blade 20 is composed of one or more blade members for the purpose of restricting the aperture diameter of the optical aperture 11 of the retaining plate 10 to a large or small size. The illustrated light-limiting blade 20 consists of one blade member, which is intended for the case where the aperture diameter of the shooting optical axis can be controlled to two steps, i.e., a Full-open state and a Partly-open state. The light-limiting blade 20 is formed by stamping a film-shaped plate material of a black pigment-impregnated polyester resin, in which a transmission pin-coupling hole 22 for fitting the partly-open aperture 21 to a later-described transmission member, and a pivot axis hole 23 to be fitted to a blade-supporting shaft (described later) are formed.

Thus, the partly-open aperture 21 having a smaller diameter than the aperture diameter of the optical aperture 11 of the retaining plate 10 is formed in the light-limiting blade 20. The light-limiting blade 20 is attached to the base 40 pivotably around the pivot axis hole 23. The light-limiting blade 20 can be made to open and close when the long hole (transmission pin-coupling hole) 22, into which the transmission pin 61 of the later-described electromagnetically-driving device B1 is fitted, is displaced by the transmission pin 61. Therefore, the light-limiting blade 20 pivots around the pivot axis hole 23. When the light-limiting blade 20 is located so that its aperture overlaps the optical-axis aperture 41 of the base 40, the photographed light quantity is restricted in the condition where the aperture diameter of the optical aperture 11 of the retaining plate 10 is narrowed by the partly-open aperture 21 of the light-limiting blade 20. Consequently, the optical aperture 11 is brought into Partly-open state. On the contrary, when the light-limiting blade 20 is in a location (posture) where it has retreated from the optical-axis aperture 41, the photographed light quantity is restricted by the diameter of the optical aperture 11 of the retaining plate 10 (Full-open state).

The above-described light-limiting blade 20 is composed of one blade as shown in the drawing. However, it may be composed of two or more blades so that large, middle, or small-sized aperture diameters can be formed when the blades are made to selectively reach the optical-axis aperture 41. Otherwise, it may be arranged so that the optical-axis aperture 41 is continuously made larger or smaller and controlled by gradually opening or closing the two or more blades with respect to the optical-axis aperture 41. In the former case where the two or more blades are selectively made to reach the optical-axis aperture 41, the light-limiting blade 20 is arranged so that the two or more blades are superposed on the base 40 together and pivotably attached to the base with a pin or the like, and a later-described driving device is selectively connected to the two or more blades by, e.g., a cam mechanism. In the latter case where the light quantity is continuously controlled by the two or more blades which have reached the optical-axis aperture 41, the two or more blades are arranged so that the optical-axis aperture 41 is covered by the outer edge portions of the blades, and the photographed light quantity can be arbitrarily controlled within a range from a large diameter to a small diameter by concurrently moving the blades with the driving device.

The shutter blade 30 has a masking region 31 formed therein, and the masking region has an area sufficient to cover the aperture diameter of the optical aperture 11 of the retaining plate 10. The shutter blade 30 is attached to the base 40 pivotably around the pivot axis hole 32. The shutter blade 30 can be made to open and close when the long hole (transmission pin-coupling hole) 33, into which the transmission pin 61 of the later-described electromagnetically-driving device B2 is fitted, is displaced by the transmission pin 61.

Therefore, the shutter blade 30 pivots around the pivot axis hole 32. When the shutter blade 30 is located so that its aperture overlaps the optical-axis aperture 41 of the base 40, the masking region 31 of the shutter blade 30 brings the optical aperture 11 of the retaining plate 10 into Closing state. On the contrary, when the shutter blade 30 is in a location (posture) where it has retreated from the optical-axis aperture 41, the optical aperture 11 of the retaining plate 10 is brought into Full-open state. While the above-described shutter blade 30 is composed of one blade as shown in the drawing, it may be composed of two or more blades.

Next, the electromagnetically-driving device B will be described with reference to FIG. 4-FIGS. 7A and 7B. The electromagnetically-driving device B is composed of an electromagnetically-driving device B1 for driving a light-limiting blade 20 and an electromagnetically-driving device B2 for driving a shutter blade 30. As shown in FIG. 2, the two electromagnetically-driving devices are exactly the same, which are fixed on the base 40 so that they are opposed to each other. As shown in FIG. 4, the electromagnetically-driving device B (B1, B2) includes: a frame member 50 (hereinafter referred to as fixing member) for fixing the electromagnetically-driving device B on the base 40 of the above-described light-quantity control part A; a rotor M composed of a permanent magnet 70 and a holder member 60 (hereinafter referred to as supporting member); an inside yoke 90 for rotatably journaling the rotor M; an outside yoke 100 for producing a magnetic field around the rotor M; and a coil-frame body 80, around which an excitation coil 81 for generating a magnetic field to appropriately excite the inside yoke 90 and outside yoke 100 is to be wound.

The permanent magnet 70 of the rotor M is formed from a ferromagnetic material, e.g., a neodymium rare-earth plastic, into a hollow, cylindrical shape. Further, the rotor M is fixed to the magnet by insert molding using a resin material such as a liquid crystal polymer so that the supporting member 60 supports the internal circumference wall of the hollow body, and then integrated with the magnet. The supporting member 60 includes: a flange part 62 for holding the permanent magnet 70; a bearing 63 having a slide bearing part 64 with its inside internal circumference face, which is made of a nonmagnetic material so that the center (X-X in FIG. 5) of the cylindrical permanent magnet 70 is coincident with the center of the rotor; and a pin-like transmission member 61 (hereinafter referred to as transmission pin) upright provided at a location appropriately spaced apart from the center (X-X in FIG. 5) so as to protrude outside the device, and those are integrated by resin molding.

Therefore, in the rotor M, the inside yoke 90 pierces the hollow space of the slide bearing part 64 of the bearing 63 supporting the permanent magnet 70 shaped into the hollow, cylindrical shape. The rotor M is supported rotatably along the external circumference of a shaft portion 91 of the inside yoke 90 used as a rotating shaft. Incidentally, the bearing 63 having the slide bearing part 64 made of a nonmagnetic material is rotated in the condition where it is in sliding-contact with the external circumference face of the shaft portion 91 of the inside yoke 90 made of a magnetic material, whereby the rotation can be made smoother in comparison to the condition where magnetic materials are in sliding-contact with each other. Further, while the slide bearing part 64 is made of a nonmagnetic material, an external circumference surface portion of the shaft portion 91 of the inside yoke 90 may be formed from a nonmagnetic material, or sliding-contact portions of the slide bearing part 64 and the shaft portion 91 may be formed from a nonmagnetic material.

While the rotor M is composed of two structures, i.e., the supporting member 60 and permanent magnet 70, it may be integrally molded from a resin magnet material, followed by forming the slide bearing part 64 on the supporting member 60. In the case where the rotor is integrally molded in this way, the following advantages are achieved in comparison to a rotor having a structure integrated by gluing discrete bodies together, insert molding or the like. The rotor can be made to be more solid. Particularly, its dimensional accuracy can be ensured by only management of molding. The accuracy of fitting of the inside yoke 90 to the shaft portion 91 can be made higher. The clearance between the inside yoke and the shaft portion can be reduced, and thus the device can be made more compact.

The yoke is composed of the inside yoke 90 located in the hollow cylindrical space and the outside yoke 100 located along the external circumference of the permanent magnet 70, and the permanent magnet 70 of the rotor M is disposed between them. The inside yoke 90 and the outside yoke 100 are formed from a soft magnetic material such as iron (Fe). The outside yoke 100 has a trough form in section and has two magnetic pole-guide pieces 101, 102, which are opposite to each other. The inside yoke 90 has a leading end portion piercing the slide bearing part 64 of the rotor M. In the inside yoke 90, the shaft portion 91 shaped into a round form in section is formed, and the slide bearing part 64 can be made to slidingly rotate around the external circumference face of the shaft portion 91. The inside yoke 90 has an end portion coupled with a securing portion 103 (FIG. 5), which is a bottom portion of the outside yoke 100 shaped into a trough form in section, by squeezing, welding or the like, whereby the inside and outside yokes are integrated.

In other words, the outside yoke 100 is formed in a cylindrical shape so as to wrap the rotor M formed in a cylindrical shape, and the inside yoke 90 is secured at the center of its bottom wall of the outside yoke 100. Also, the outside yoke 100 includes two or more pectinated pieces so as to form magnetic poles opposite to the external circumference of the permanent magnet 70. The outside yoke 100 shown in the drawing has a pair of such pectinated pieces provided at locations opposite to each other with the permanent magnet 70 disposed therebetween so that the pectinated pieces face N and S magnetic poles of the permanent magnet 70. Thus, the inside yoke 90 and the outside yoke 100 are formed from a soft magnetic material such as a iron-based material so as to lead a magnetic field to the circumference of the permanent magnet 70 of the rotor M. Further, the inside yoke 90 is secured to the outside yoke 100 by squeezing or other securing means, whereby the inside and outside yokes are coupled magnetically. In addition, the outside yoke 100 supports the inside yoke 90, thereby to maintain the structural strength of the yoke.

Around the inside yoke 90, the excitation coil 81 is wound. In the embodiment shown in the drawing, the excitation coil 81 is arranged as follows: a conducting wire is wound around the coil-frame body 80 formed from a resin material such as a liquid crystal polymer thereby to form an excitation coil 81, and then the resultant excitation coil 81 is fit in a securing portion 92 of the inside yoke 90. Hence, when a current is conducted in the excitation coil 81, the magnetic field generated by the excitation coil 81 is led by the outside yoke 100 and the inside yoke 90. As a result, magnetic poles opposite to each other are formed with the permanent magnet 70 of the rotor M disposed therebetween.

Incidentally, the coil-frame body 80 shown in the drawing is inserted in the inside yoke 90 having a shaft-like form, and the lower end portion 93 of the inside yoke 90 in FIG. 5 is secured to the outside yoke 100 by squeezing, welding, or other securing means. Hence, the coil-frame body 80 is to be fixed to the outside yoke 100 in the condition where it is supported by the inside yoke 90. The reference number 94 in FIG. 5 represents a flange for supporting the coil-frame body 80 formed on the inside yoke 90. The magnetic pole-guide pieces 101, 102 of the outside yoke 100 are secured to the fixing member 50 as follows.

Figure 6:
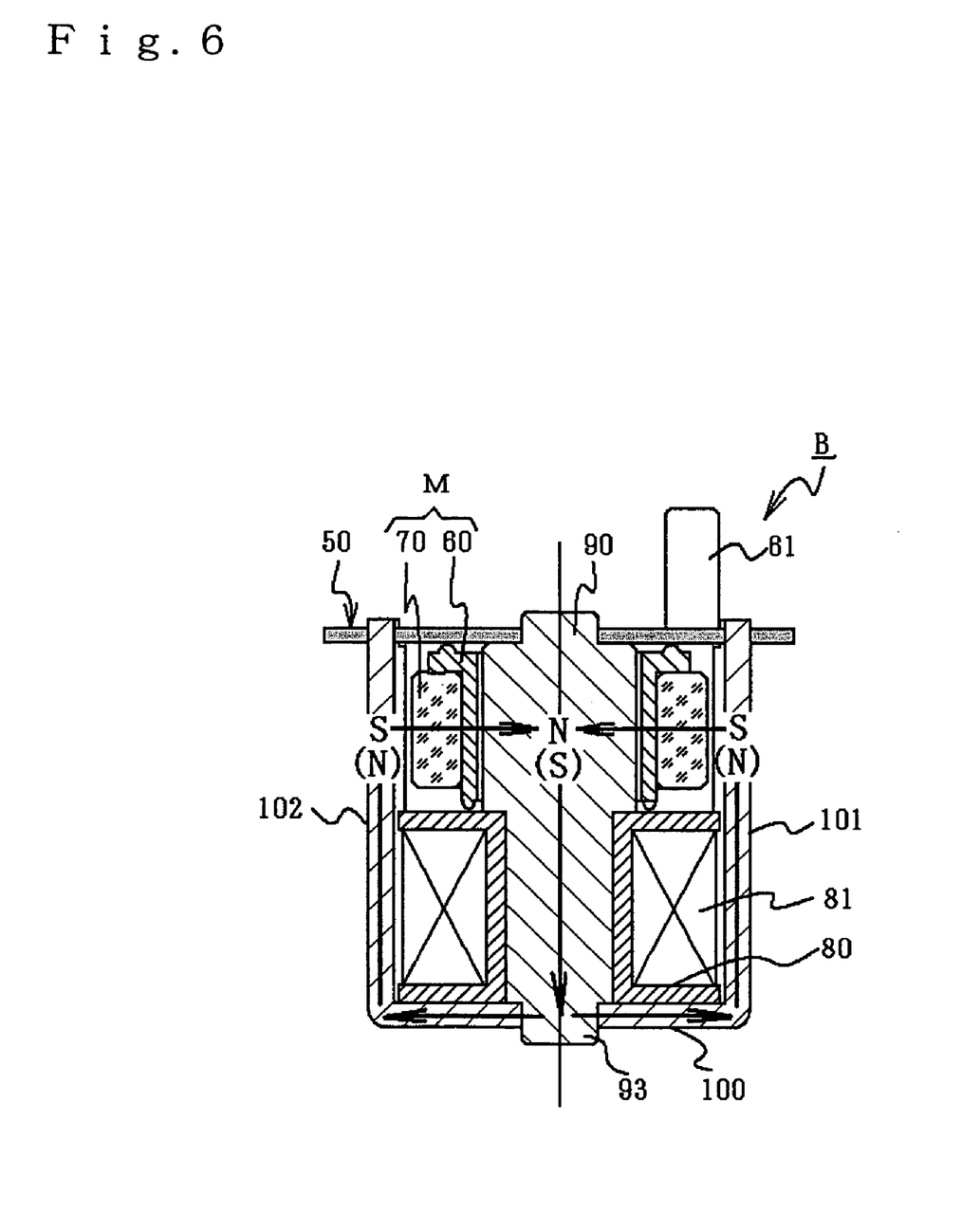
FIG. 6 is an explanatory illustration of a magnetic circuit of the driving part in the device shown in FIG. 4.
Figure 7:
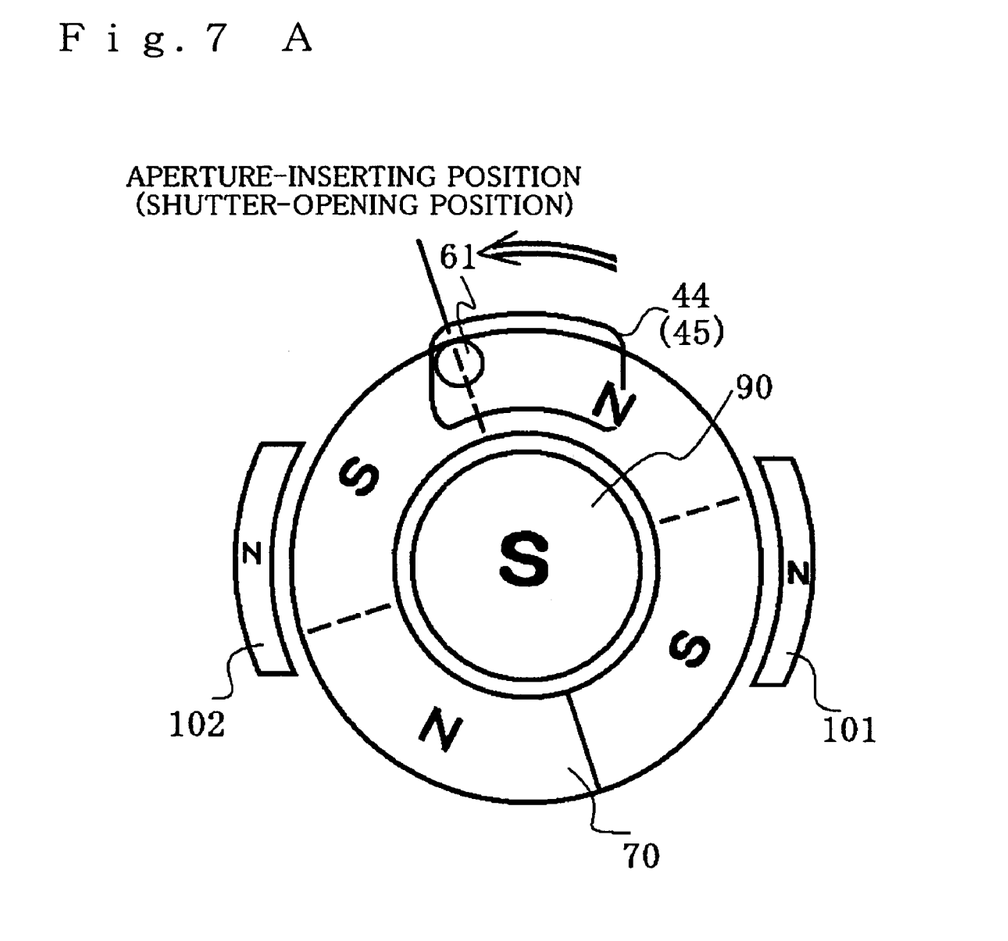
FIG. 7A is an explanatory illustration of an operation condition of the device shown in FIG. 4, showing a condition in which an electric current in a direction is supplied.
FIG. 7B is an explanatory illustration of an operation condition of the device shown in FIG. 4, showing a condition in which an electric current in a reverse direction is supplied.

The fixing member 50 is shaped by stamping a metal sheet material made of a nonmagnetic material. The fixing member 50 has yoke-fixing notch portions 51 formed therein. The leading end portions of the magnetic pole-guide pieces 101, 102 are fit in the yoke-fixing notch portions 51, whereby the pieces are positioned. The fixing member 50 journals the leading end portion 95 of the shaft portion 91 of the inside yoke 90 through its hole 53 in the central portion thereof. The reason why the fixing member 50 is made of a nonmagnetic material is to form a magnetic circuit by the inside yoke 90, outside yoke 100 and permanent magnet 70 as shown in FIG. 6.

Thus, the outside yoke 100 is secured to the fixing member 50, and the inside yoke 90 and coil-frame body 80 are secured to the outside yoke 100. Therefore, the rotor M is rotatably journaled around the inside yoke 90 between the fixing member 50 and the coil-frame body 80. Also, the rotor M has ribs 65 and 66 formed thereon. The ribs 65 and 66 are intended to reduce sliding friction during the time of rotation for smooth rotation. The ribs 65 and 66 protrude in directions along the axis center (X-X in FIG. 5) from abutting faces of the opposite flat face portions facing the fixing member 50 and coil-frame body 80. While the ribs 65 and 66 are formed as protrusions at three locations, such ribs maybe a guide protruding in a doughnut-like form.

Also, the coil-frame body 80 has, in addition to a frame body portion 82 around which the excitation coil 81 is to be wound, lead-termination arms 83 and 84 integrally shaped by resin molding. Around the lead-termination arms 83 and 84, lead end portions as winding start and end of the excitation coil 81 are made to entwine.

Now, the magnetic circuit constituted by the yoke and rotor will be described. In the rotor M, the external circumference portions of the hollow, cylindrical permanent magnet 70 are magnetized so as to have four N-S magnetic poles as shown in FIGS. 7A and 7B. The inside yoke 90 and the outside yoke 100 are disposed so as to be opposite to each other with the permanent magnet 70 placed therebetween. The inside yoke 90 has a rod-like shape in the central hollow space portion of the permanent magnet 70, and forms a magnetic pole on its external circumference face. The outside yoke 100 is disposed so that the two magnetic pole-guide pieces 101 and 102 form magnetic poles in mutually opposed locations on the external circumference face of the permanent magnet 70. The inside yoke 90 and the outside yoke 100 are arranged so that they lead a magnetic force generated by the excitation coil 81 to form magnetic poles on opposite sides of the permanent magnet 70 therebetween.

When an electric current in one direction is supplied to the excitation coil 81, N poles are formed on the two magnetic pole-guide pieces 101 and 102 of the outside yoke 100, and S pole is formed on the inside yoke 90, which force the rotor M to rotate counterclockwise in the drawing, as shown in FIG. 7A. On the contrary, as shown in FIG. 7B, when an electric current in the reverse direction is supplied to the excitation coil 81, S poles are formed on the two magnetic pole-guide pieces 101 and 102 of the outside yoke 100, and N pole is formed on the inside yoke 90, which force the rotor M to rotate clockwise in the drawing. Therefore, on the rotor M the transmission pin 61 for transmitting the rotation to the inside yoke 90 and the outside thereof is formed integrally. The transmission pin 61 extends through the notch portion 52 of the fixing member 50 and pierces the long hole (slit) 44, 45 of the base 40, and is fit in the long holes 22 and 33, which are transmission pin-coupling holes of the light-limiting blade 20 and the shutter blade 30.

Hence, supplying an electric current in one direction to the excitation coil 81 forces the rotor M to rotate counterclockwise, and supplying an electric current in the reverse direction to the excitation coil forces the rotor M to rotate clockwise. Therefore, the forward and reverse rotations of the rotor M are transmitted to the light-limiting blade 20 and the shutter blade 30 by the transmission pin 61. As a result, the light-limiting blade 20 and the shutter blade 30 are pivoted around the blade-supporting shafts 46 and 47 clockwise or counterclockwise. In the condition shown in FIG. 7A, the light-limiting blade 20 is located so that its aperture overlaps the optical-axis aperture 41 and as such, the partly-open aperture 21 restricts the pickup-image light quantity (Partly-open state). In the condition shown in FIG. 7B, the light-limiting blade 20 is moved to a location where it has retreated from the optical-axis aperture 41 and as such, the optical-axis aperture 41 restricts the pickup-image light quantity (Full-open state). On the other hand, the shutter blade 30 is located over the optical-axis aperture 41 and opens the optical aperture 11 of the retaining plate 10 in the condition shown in FIG. 7A. Further, in the condition shown in FIG. 7B, the shutter blade 30 is moved to a location where it has retreated from the optical-axis aperture 41 and closes the optical aperture 11 of the retaining plate 10.

The long hole (slit) 44, 45 formed in the base 40 is disposed in locations such that a motion-restricting region to reciprocate the rotor M in forward and reverse directions within a predetermined angle is formed, as shown in FIGS. 7A and 7B. Therefore, the rotor M swings by the predetermined angle within a range between end faces of the long hole (slit) 44, 45 formed in the base 40. Thus, the transmission pin 61 drives the light-limiting blade 20 to open and close it between the Full-open position and the Partly-open position, and drives shutter blade 30 to open and close it between the Open position and the Close position.

The light-limiting blade 20 needs to be stopped in the Full-open position (the state shown in FIG. 7B) and the Partly-open position (the state shown in FIG. 7A), which is not shown in the drawing. For the purpose of this, the following methods have been known, and any of them can be adopted. The first is a method of conducting a weak electric current through the excitation coil 81 thereby to hold the light-limiting blade 20 in the positions. The second is a method of restricting the position of the light-limiting blade 20 by applying an electric current to the excitation coil 81 in the condition where the blade 20 is urged by a close spring in one direction. The third is a method of providing an iron piece, which magnetically attracts the blade 20, in the circumference of the blade.

Now, the effect of the invention will be described. When the excitation coil 81 shown in FIG. 6 is supplied with an electric current, the outside yoke 100 and the inside yoke 90 are magnetized by a magnetic field generated by the coil. At this time, the inside yoke 90 and the outside yoke 100 are magnetically coupled through their one ends, and the other ends are opposed to each other through the rotor M. Therefore, an S pole develops on the inside yoke 90 when an N pole develops on the outside yoke 100, and an N pole develops on the inside yoke 90 when an S pole develops on the outside yoke 100. In other words, the outside yoke 100 and the inside yoke 90 have one end mutually secured by squeezing or welding and are magnetically coupled to each other, and magnetic poles (N-S poles), which are opposite to each other through the permanent magnet 70 placed therebetween, are formed on the leading end portion of the rod-like inside yoke 90 and the leading end portions of the magnetic pole-guide pieces 101 and 102 of the outside yoke 100.

Moreover, as shown in FIGS. 7A and 7B, the external circumference portion of the rotor M having a hollow, cylindrical shape is magnetized into four poles, and the transmission pin 61 is disposed so that it is located overlapping one of the magnetized portions. In other words, the rotor M magnetized into four poles is restricted in its rotational region by the long hole (slit) 44, 45 of the base 40 so that it swings clockwise and counterclockwise by the predetermined angle around the location of polarization and as such, when the N pole develops on the magnetic pole-guide pieces 101 and 102 and the S pole develops on the inside yoke 90 as shown in FIG. 7A, the N pole of the magnetic pole-guide pieces 101 and 102 and the S pole of the rotor M are magnetically attracted to each other. Concurrently, the N poles of the rotor M are magnetically repelled by the N poles of the magnetic pole-guide pieces 101 and 102, and thus the rotor M is rotated counterclockwise. This rotation of the rotor M is stopped at a location where the transmission pin 61 abuts against the long hole (slit) 44, 45 of the base 40. At the location, the permanent magnet 70 of the rotor M is attracted by the magnetic pole-guide pieces 101 and 102, which are a magnetic substance.

Thus, the magnet is still held at the location even when the application of electric current to the excitation coil 81 is stopped (turned OFF). This is because the magnetic poles (S poles) of the rotor M are located at the (nearby) location close to the magnetic pole-guide pieces 101 and 102.

Next, when an electric current in the reverse direction is supplied to the excitation coil 81, S poles are formed on the magnetic pole-guide pieces 101 and 102 of the outside yoke 100 and an N pole is formed on the inside yoke 90, as shown in FIG. 7B. In this condition, the S poles on the magnetic pole-guide pieces 101 and 102 are magnetically attracted by the N pole of the rotor M, and the S pole of the rotor M is repelled magnetically. Thus, the rotor rotates clockwise, and continues rotating until the transmission pin 61 is restricted by the long hole (slit) 44, 45 of the base 40 and stopped. Even when the application of electric current to the excitation coil 81 is stopped in this condition, the N poles of the rotor M are attracted by the magnetic pole-guide pieces 101 and 102, which are a magnetic substance, and then the rotor M is held in the condition where the transmission pin 61 is engaged by an edge of the long hole (slit) 44, 45, as in the case described above. By not providing the outside yoke 100 for the whole external circumference of the permanent magnet 70 included by the rotor M, but disposing a constituent of the outside yoke 100 in at least one location or in two opposite locations in the manner as stated above, it becomes possible to hold the light-limiting blade 20 in position when the application of electric current to the excitation coil 81 is turned OFF.

In the embodiment described above, a permanent magnet 70 magnetized into four poles is used. However, the magnet may be magnetized into four poles in its circumferential direction and magnetized so that N-S poles are formed in its radial direction. With such arrangement, the direction of a rotation force caused by magnetic attraction between the poles on the internal circumference side of the rotor M and an elliptical nearby portion of the inside yoke 90 is identical to the direction of rotation force caused on the external circumference side of the motor M and as such, the driving torque of the electromagnetically-driving device is increased. Particularly, like the device shown in FIG. 1, the excitation coil is disposed along the rod shaft of the base end portion 93 of the inside yoke 90, the leading end portion of the inside yoke 90 is disposed so as to be close to the rotor, and the shaft portion 91 is provided in the central portion. As a result, the magnetic attraction force between the leading end portion of the inside yoke 90, where a large magnetic pole is developed, and the rotor is not influenced by the structure of the bearing, and therefore a large rotation force can be obtained with a small electric power consumption.

Figure 8:
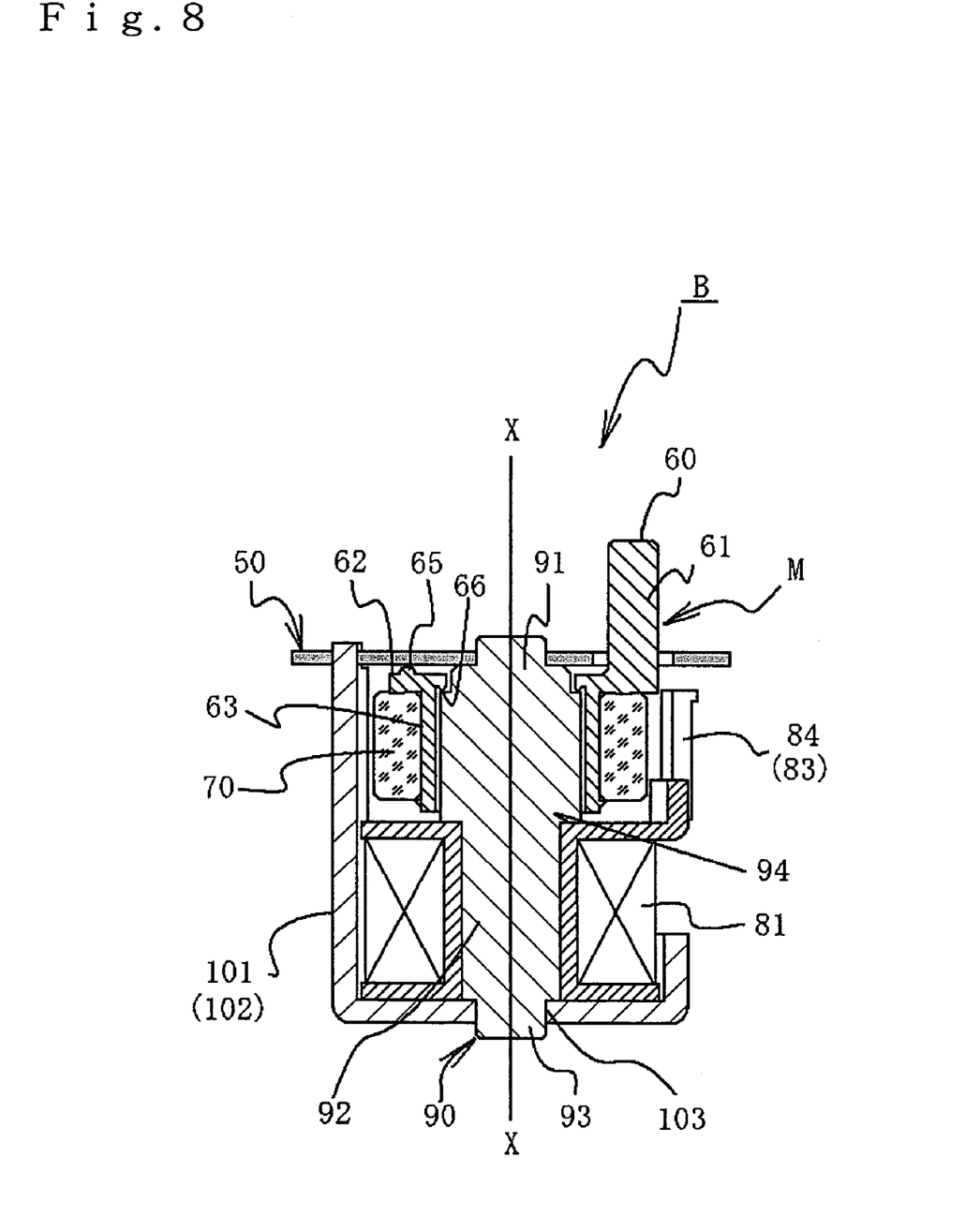
FIG. 8 is a center longitudinal sectional view showing a modification of a driving part (driving device) differing from the device shown in FIG. 5.

Next, a modification shown in FIG. 8 will be described. When the supporting member 60 (holder member) for integrally holding a permanent magnet 70 is fitted and supported to the shaft portion 91 of the inside yoke 90 as in the case of the above-described device, in the above-described embodiment the supporting member is supported so that it does not move in the thrust direction between the fixing member 50 and the coil-frame body 80, whereas in the modification shown in the drawing the following structure is adopted. Here, constituents having the same configurations and functions as those of the constituents in the above-described embodiment are identified by the same reference numbers and their descriptions are omitted.

The supporting member 60 integrally formed by resin molding with the permanent magnet 70 and the transmission member 61 (transmission pin) has a bonding face 65 abutting against the fixing member 50 and a bonding face 66 abutting against the inside yoke 90, which are provided in locations as shown in the drawing. The bonding face 65 includes a rib protruding from the supporting member 60 on the side of the fixing member 50. The bonding face 66 includes a rib protruding on the side of the inside yoke 90. The rib may be formed in at least one location in each end face of the supporting member, and preferably the rib is formed in three locations in a plane.

In the foregoing description the case where the rotor M is slidably supported with respect to the shaft portion 91 of the inside yoke 90 between the fixing member 50 and the coil-frame body 80 around which the coil 81 is wound, ribs 65 and 66 are formed on the bonding faces with the fixing member 50 and coil-frame body 80 respectively has been described. However, the invention is not limited to these structures. The friction load while the rotor is sliding can be reduced by forming the rib appropriately in a few locations in top and bottom end faces of the supporting member in a direction of the length of the shaft (thrust direction) slidably with respect to the shaft portion 91 of the inside yoke 90 as shown in FIG. 8. In this case, the ribs are formed only on the side of the abutting face with the fixing member 50 as a matter of convenience of the space.

Also, with the above-described embodiment, a light quantity-control device which can be assembled in image-pickup barrels of various camera devices has been described. However, it is also possible to utilize a light quantity-control device disclosed herein in optical systems of projection devices including a projector and other optical apparatus.

As described above, according to the invention, a bearing structure between a rotor including a hollow, cylindrical shaped permanent magnet and an inside yoke disposed in the hollow space of the rotor is slidably supported by a bearing portion with respect to the shaft portion, in which a shaft portion shaped into a round form in section is formed in the inside yoke, and the shaft portion is fitted to the bearing portion formed in the hollow space of the rotor. Therefore, the invention provides the following advantages.

As for the inside yoke, the shaft portion extends through the hollow space of the rotor, and the inside yoke slidably supports the bearing portion of the rotor on the external circumference face of the shaft portion. Therefore, even when the diameter of the inside yoke is made smaller, the shaft portion can be easily manufactured. In addition, because the bearing portion of the rotor is slidably fitted and supported to the shaft portion, reliable and smooth bearing can be achieved while suppressing the displacement such as center deviation, and therefore, it is possible to downsize the device. Further, no end face of the inside yoke is notched for the purpose of bearing, and no reduction in permeance of the magnetic circuit is caused. Furthermore, the shaft portion formed in the external circumference wall of the inside yoke is fitted in the bearing portion formed in the hollow rotor internal circumference wall and as such, the magnetic gap between the magnet of the rotor and the inside yoke can be held precisely, and therefore, smooth motion of the rotor can be obtained.

According to the invention, an electromagnetically-driving device is made more compact in this manner, and therefore it is also possible to arrange a more compact and lightweight light quantity-control device incorporating such electromagnetically-driving device.

The present application claims the right of priority based on Japanese Patent Application No. 2005-152420 filed May 25, 2005, and the disclosure is incorporated by reference herein.

While the invention has been explained with reference to the specific embodiments of the invention, the explanation is illustrative and the invention is limited only by the appended claims.

What is claimed is:

1. An electromagnetically-driving device, comprising:
a rotor with a hollow, cylindrical permanent magnet having a rotation center in a center of the magnet,
an outside yoke disposed on an external circumference side of the rotor, the outside yoke comprising a soft magnetic member having a pair of magnetic pole-guide pieces opposed to each other in locations between which magnetic poles of the permanent magnet are sandwiched,
an inside yoke disposed on an internal circumference side of the rotor, the inside yoke having a shaft portion shaped into a circular sectional form provided in at least a portion thereof, and secured and disposed in a central portion between the magnetic pole-guide pieces, and
a coil for magnetically exciting the inside and outside yokes,
wherein the rotor is integrally provided with a transmission member for transmitting rotation outside thereof, and comprises a bearing portion in an internal circumference face, the bearing portion being fitted to the shaft portion of the inside yoke, and
the bearing portion of the rotor is rotatably fitted and supported to the shaft portion of the inside yoke.

2. The electromagnetically-driving device of claim 1, further comprising a frame member for affixing and supporting an end portion of the outside yoke,
wherein the outside yoke comprises a cylindrical member having a trough sectional form,
the inside yoke comprises a shaft-like member, with one end secured to and supported by a bottom portion of the outside yoke, and
the rotor is supported by the bearing portion fitted to the shaft portion provided in the inside yoke.

3. The electromagnetically-driving device of claim 1, further comprising a coil frame fitted to the inside yoke, with the coil being wound around the coil frame,
wherein the rotor has an engaging face abutting against the frame member, the engaging face capable of restricting movement in a thrust direction.

4. The electromagnetically-driving device of claim 1, further comprising a nonmagnetic frame member to which the outside yoke is affixed and secured,
wherein the rotor is fitted and disposed to the inside yoke, and is disposed between the frame member and coil frame, and has a rib formed on at least one of a top and a bottom end face thereof for reducing rotation-induced friction.

5. The electromagnetically-driving device of claim 1, wherein at least one of a fitting face of the shaft portion of the inside yoke, and the bearing portion of the rotor, is composed of a nonmagnetic material.

6. The electromagnetically-driving device of claim 1, wherein the rotor further comprises a holder member composed of a nonmagnetic material for holding the permanent magnet, and the holder member comprises the bearing portion.

7. The electromagnetically-driving device of claim 5, wherein the rotor is integrally formed with the permanent magnet and bearing portion by a die molded magnet resin material, and a sliding-contact face of the shaft portion of the inside yoke to be fitted to the bearing portion is composed of a nonmagnetic material.

8. A light quantity-control device, comprising:
a base having an optical-axis aperture;
a blade member for restricting the optical-axis aperture, the blade member being attached to the base; and
the electromagnetically-driving device according to claim 1 for driving the blade member.

9. The light quantity-control device of claim 8, further comprising a nonmagnetic frame member, and a coil frame fitted to the inside yoke, with the coil being wound around the coil frame,
wherein a leading end portion of each of the two magnetic pole-guide pieces of the outside yoke is secured to the frame member, and
the rotor is disposed between the frame member and the coil frame.

* * * * *